(12) United States Patent
Egami

(10) Patent No.: US 6,718,782 B2
(45) Date of Patent: Apr. 13, 2004

(54) FUNCTIONAL COMBINED EQUIPMENT FOR A MOTOR VEHICLE

(75) Inventor: Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 132 days.

(21) Appl. No.: 10/175,100

(22) Filed: Jun. 20, 2002

(65) Prior Publication Data

US 2002/0195285 A1 Dec. 26, 2002

(30) Foreign Application Priority Data

Jun. 25, 2001 (JP) .......................... 2001-191074

(51) Int. Cl.[7] .................. F25B 27/00; B60K 41/02
(52) U.S. Cl. .............. 62/236; 60/706; 180/53.8; 477/5
(58) Field of Search ............. 62/236, 323.3, 62/323.4; 180/53.8; 60/706; 477/5

(56) References Cited

U.S. PATENT DOCUMENTS

| 5,056,326 A | 10/1991 | Ohkumo et al. ............... 62/133 |
| 5,896,750 A | 4/1999 | Karl ............................. 62/236 |
| 6,269,895 B1 | 8/2001 | Tanuguchi et al. .......... 180/65.2 |
| 6,367,270 B2 * | 4/2002 | Nimi et al. ................ 62/236 X |
| 6,501,190 B1 | 12/2002 | Seguchi et al. .............. 290/46 |

FOREIGN PATENT DOCUMENTS

| EP | 0 645 271 A2 | 3/1995 | ............ B60K/6/02 |
| EP | 0 916 546 A2 | 5/1999 | ............ B60K/41/00 |
| FR | 2 675 085 A1 | 10/1992 | ............ B60H/1/00 |
| JP | 05-319131 | 12/1993 | ............ B60K/25/04 |
| JP | 09-109694 | 4/1997 | ............ B60K/8/00 |
| JP | 11-107798 | 4/1999 | ............ B60K/17/04 |
| JP | 2000-229516 | 8/2000 | ............ B60H/1/32 |
| JP | A 2001-128308 | 5/2001 | ............ B60L/11/14 |

* cited by examiner

Primary Examiner—William Wayner
(74) Attorney, Agent, or Firm—Oliff & Berridge, PLC (57) ABSTRACT

A power distributing mechanism distributes a power at a first axis from the engine to a second axis coupled to a motor generator, and a third axis coupled to a compressor for air conditioning. A clutch mechanism provides the connection/disconnection of the second axis to/from the third axis, and a lock mechanism provides the locking and unlocking of rotation of the third axis. The control unit inhibits switching operations of the clutch mechanism and lock mechanism for a startup transition period of the engine and a to-stop transition period of the engine and controls the inverter to suppress the operation of the motor generator in the generator mode for a startup transition period of the compressor and a to-stop transition period of the compressor, while the engine is running.

10 Claims, 6 Drawing Sheets

FUNCTIONAL COMBINED EQUIPMENT FOR A MOTOR VEHICLE

BACKGROUND OF THE INVENTION

1. Field of the Invention

This invention relates to a functional combined equipment for a motor vehicle.

2. Description of the Prior Art

To improve a mileage, the idling-stop function was provided to motor vehicles. In these motor vehicles, the compressor for air conditioning must be stopped on idling because of the stop of the engine. Japanese patent application provisional publication No. 2000-229516 discloses a hybrid air conditioning system, wherein the compressor for air conditioning is driven by a motor while the engine stops. However, this system is complicated in structure and costly because of the additional motor.

U.S. Pat. Ser. No. 5,896,750 discloses a prior art device for the air conditioning of a vehicle when running and parked. In this device, a motor generator as an alternator and a motor and a compressor for the air conditioning are driven by the engine through a one-way clutch in a free-wheel upon running. When parked, the motor generator is supplied with drive currents to rotate. The power is transmitted only to the compressor because of the function of the one-way clutch. In this device, the length in the longitudinal direction of the engine increases because of the existence of the free-wheel.

Thus, it is required to provide a device for unitedly controlling the air conditioning system and the alternator with a simple structure at a low cost without increase in the length in the longitudinal direction of the engine.

SUMMARY OF THE INVENTION

The aim of the present invention is to provide a superior functional combined equipment for a motor vehicle.

According to the present invention, a first aspect of the present invention provides a functional combined equipment for a motor vehicle having an engine comprising:

- a motor generator;
- a compressor for air conditioning;
- a power distributing mechanism for distributing a power at a first axis from said engine to a second axis coupled to said motor generator, and a third axis coupled to said compressor;
- a clutch mechanism for connection of said second axis to said third axis and disconnection of said second axis from said third axis;
- a lock mechanism for locking and unlocking rotation of said third axis; and
- a control unit for controlling power transmissions between said first and second axes, between said first and third axes, and between said second and third axes with said power distributing mechanism, said clutch mechanism, said lock mechanism, and said inverter, wherein said control unit inhibits switching operations of said clutch mechanism between said connection and said disconnection and said lock mechanism between locking and unlocking said rotation of said third axis for a startup transition period of said engine and a to-stop transition period of said engine.

According to the present invention, a second aspect of the present invention provides the functional combined equipment based on the first aspect, wherein said control unit includes an inverter and operates said motor generator to supply a torque from said motor generator to said compressor using said inverter with unlocking rotation of said third axis with said lock mechanism, and with said connection of said second axis to said third axis using said clutch mechanism when said engine stops, and wherein said control unit locks said third axis with said lock mechanism and disconnects said second axis from said third axis when said compressor is driven by neither of said engine nor said motor generator.

According to the present invention, a third aspect of the present invention provides the functional combined equipment based on the first aspect, wherein said control unit includes an inverter and inhibits said compressor from operating by holding said third axis locked with said lock mechanism and by holding said disconnection of said second axis from said third axis for said startup transition period of said engine and as well as operates said inverter to operate said motor generator in said motor mode to drive said engine through said power distributing mechanism to start up said engine.

According to the present invention, a fourth aspect of the present invention provides the functional combined equipment based on the first aspect, wherein said control unit holds said rotation of said third axis locked with said lock mechanism and holds said connection of said second axis to said third axis with clutch mechanism for said to-stop transition period.

According to the present invention, a fifth aspect of the present invention provides the functional combined equipment based on the first aspect, wherein said power distributing mechanism comprises a planetary gear mechanism.

According to the present invention, a sixth aspect of the present invention provides the functional combined equipment based on the fifth aspect, wherein said planetary gear mechanism comprises a carrier connected to said first axis, a ring gear connected to said second axis, and a sun gear connected to said third axis.

According to the present invention, a seventh aspect of the present invention provides a functional combined equipment for a motor vehicle having an engine comprising:

- a motor generator;
- an inverter for operating said motor generator in motor and generator motor modes;
- a compressor for air conditioning;
- a power distributing mechanism for distributing a power at a first axis from said engine to a second axis coupled to said motor generator, and a third axis coupled to said compressor;
- a clutch mechanism for connection of said second axis to said third axis and disconnection of said second axis from said third axis;
- a lock mechanism for locking and unlocking rotation of said third axis; and
- a control unit for controlling power transmissions between said first and second axes, between said first and third axes, and between said second and third axes with said power distributing mechanism, said clutch mechanism, said lock mechanism, and said inverter, wherein said control unit controls said inverter to suppress the operation of said motor generator in said generator mode for a startup transition period of said compressor and a to-stop transition period of said compressor, while said engine runs.

According to the present invention, an eighth aspect of the present invention provides the functional combined equipment based on the seventh aspect, wherein said control unit operates said motor generator to supply a torque from said motor generator to said compressor using said inverter with the unlocking said rotation of said third axis using said lock mechanism, and with said connection of said second axis to said third axis using said clutch mechanism when said engine stops, and wherein said control unit locks said third axis with said lock mechanism and disconnects said second axis with said clutch mechanism from said third axis when said compressor is driven by neither of said engine nor said motor generator.

According to the present invention, a ninth aspect of the present invention provides the functional combined equipment based on the seventh aspect, wherein said power distributing mechanism comprises a planetary gear mechanism.

According to the present invention, a tenth aspect of the present invention provides the functional combined equipment based on the ninth aspect, wherein said planetary gear mechanism comprises a carrier connected to said first axis, a ring gear connected to said second axis, and a sun gear connected to said third axis.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
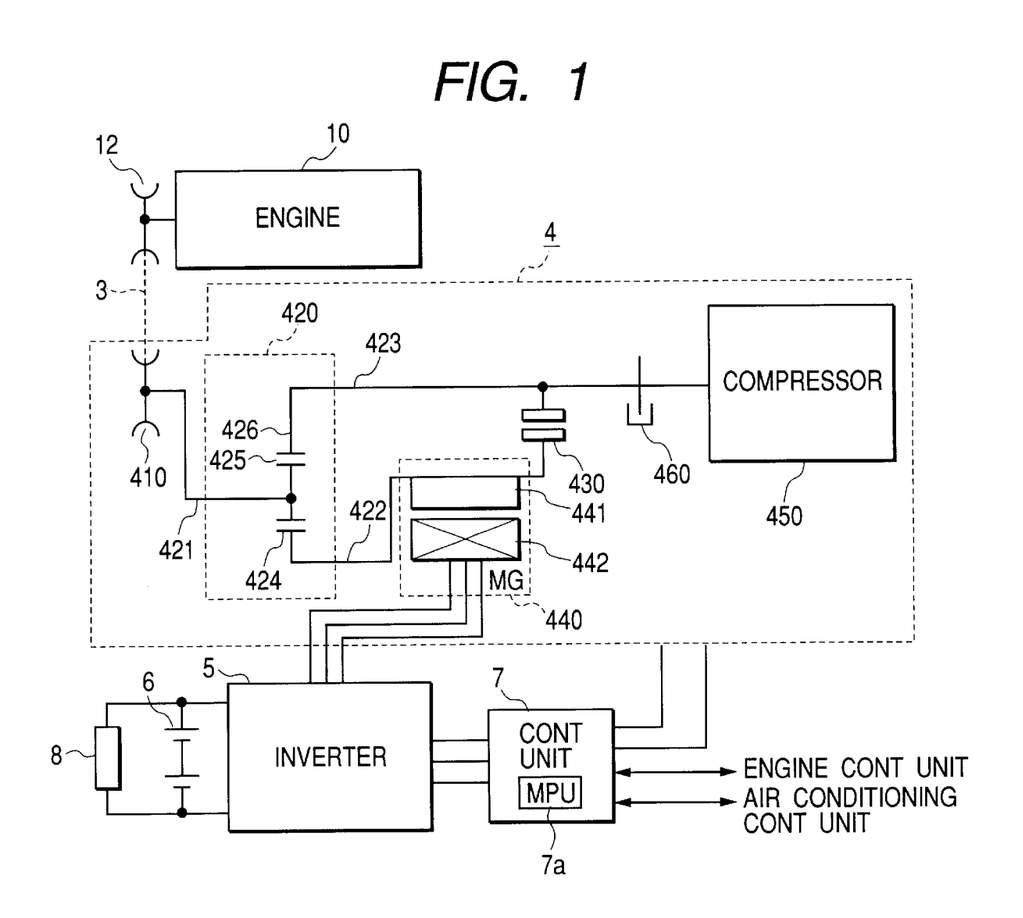
FIG. 1 is a block diagram of a system for a motor vehicle according to this invention.

FIG. 1 is a block diagram of a system for a motor vehicle according to this invention.

Structure

The system includes a functional combined equipment 4 mechanically coupled to a crank pulley 12 of the internal combustion engine 10, a three-phase inverter 5 for supplying an electric power to and receiving an electric power from the motor generator 440, a control unit 7 for controlling the functional combined equipment 4 and the inverter 5, (secondary) batteries 6, and an electrical load 8 supplied with the power from the batteries 6.

The functional combined equipment 4 includes an input pulley 410 coupled to the crank pulley 12 of the internal combustion engine 10 with a belt 3, a planetary gear mechanism (power distributing mechanism) 420 having a first axis 421 connected to the input pulley 410, a second axis 422, a third axis 423, a ring gear 424, a carrier 425, and a sun gear 426 for distributing a torque at the first axis 421 to the second axis 422 and to the third axis, the air compressor 450 coupled to the third axis 423, a motor generator 440 coupled to the second axis 422, a clutch 430 for connecting and disconnecting the second axis 422 to/from the third axis 423, and a lock mechanism 460 for locking and unlocking the rotation of the third axis 423.

In the planetary gear mechanism 420, the ring gear 424 is coupled to the second axis 422 which is coupled to a rotor 441 of the motor generator 440. The carrier 425 comprises a circular member having an axis coupled to the input pulley 410 through the first axis 421, rotating around the sun gear 426, and rotatably supporting a plurality of planet pinion gears (not shown). The sun gear 426 is coupled to the third axis 423 which is connected to a rotation axis of the compressor 450 for the air conditioning. The third axis 423 can be coupled to the second axis 422 through the clutch 430. That is, the third axis 423 is selectively coupled to the second axis 422 through the clutch 430. Moreover, the third axis 423 can be locked by the lock mechanism 460. That is, the third axis 423 is selectively locked by the lock mechanism 460. The clutch 430 comprises an electromagnetic clutch driven by a solenoid for example. The lock mechanism 460 comprises an electromagnetic brake or a hydraulic brake. The clutch 430 may be integrated with the lock mechanism 460. Moreover, the clutch 430, the lock mechanism 460, and the planetary gear mechanism 420 may be integrated. Further, the housing of the planetary gear mechanism 420 may be integrated with the housing of the motor generator 440.

The sun gear 426 and the ring gear 424 are in gear with the planet pinion gears. The planet pinion gears are rotatably supported by the carrier 425. The carrier 425 revolves around the sun gear 426.

As mentioned above, the planetary gear mechanism 420 distributes a power (torque) at the first axis 421 to the second axis 422 and to the third axis 423. Here, if the third axis 423 is locked by the locking mechanism 460 and the clutch is released (disconnected) because of stop of the compressor 450, substantially all power (torque) at the first axis 421 is transmitted to the second axis 422.

Since the planetary gear mechanism 420 is well known, the detailed description is omitted.

The motor generator 440 comprises a permanent magnet type of synchronous motor generator. More specifically, the motor generator 440 has the rotor 441 having permanent magnet poles and a stator facing the rotor 441. The stator has stator coils 442 supplied with three-phase currents generated by the inverter 5 in accordance with the position of the rotor 441 in a motor mode. In a generator mode, the inverter 5 effects switching to convert three phase currents from the motor generator driven by the internal combustion engine 10 into a dc current supplied to the batteries 6 and the electrical load 8. Regarding the motor generator 440, another type of motor with generation function or a generator with the motor function can be used.

The planetary gear mechanism 420 can be controlled by the clutch 430. That is, the operation of the clutch 430 can select either of the operation that the second axis 422 and the third axis 423 are rotated together at the same rotation speed or the operation that they are independently rotated.

The compressor 450 for air conditioning is well-known. Thus, the detailed description is omitted.

The control unit 7 has a starter mode, an electric-powered air conditioning mode, a usual mode 1, and a usual mode 2 and selects one of these modes in accordance with information from an internal combustion engine control unit (not shown) and an air conditioning control unit (not shown) to control the inverter 5, the clutch 430, and the lock mechanism 460 in the selected mode.

In the starter mode, the motor generator 440 starts up the internal combustion engine 10. The electric-powered air conditioning mode indicates that the motor generator 440 drives the compressor 450 (supplies a torque from the motor generator 440 to the compressor 450). In the usual mode 1, the engine 10 drives the motor generator 440 and the compressor 450. In the usual mode 2 indicates that the engine 10 drives the motor generator 440, but does not drive the compressor 450.

In the usual mode 1 and the usual mode 2, it is possible to withdraw energy from the traveling inertia by the motor generator 440 and the compressor 450or only by the motor generator 440 when slowdown. Moreover, the torque assistance is possible by driving the motor generator 440 on the accelerating in the usual mode 1 and usual mode 2. Further, in this condition if the compressor 450 is being operated, stopping the compressor 450 increases the acceleration.

Operation

Figure 2:
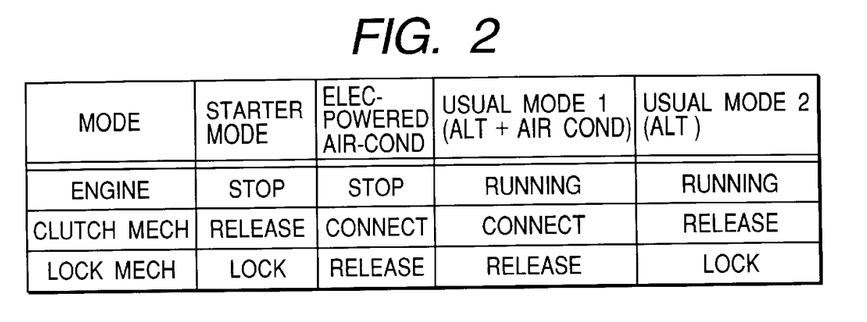
FIG. 2 shows a table of operation conditions in respective modes according to this invention.

FIG. 2 shows a table of operation conditions in respective modes.

Starter Mode

When the engine 10 is started up from the idling stop condition, the system enters the starter mode. In the starter mode, the lock mechanism 430 is operated to lock the third axis 423.

This inhibits the third axis 423 and the sun gear 426 from rotating, so that the rotation axis of the motor generator 440 is mechanically coupled to the input pulley 440 through the ring gear 424, the planet pinion gears, and the carrier 425. In this condition, the control unit 7 operates the inverter 5 in the motor mode to drive the motor generator 440 to give the engine 10 a startup torque, so that the engine 10 starts up. Because the rotation speed of the carrier 425 is lower than that of the ring gear 424, the torque generated by the motor generator 440 is enhanced to give the engine 10 a larger startup torque.

Usual Mode 2

The usual mode 2 provides electric power generation by the motor generator 440 driven by the engine 10. In this mode, the control unit 7 releases the clutch 430 and locks the third axis 423 with the lock mechanism 460 and controls the inverter 5 to generate an electric power. More specifically, the inverter 5 effects switching and rectifying operations to supply a dc current to the batteries 6 and to various electric loads 8 in the motor vehicle. In this connection condition, it is also possible to provide torque assistance by driving the motor generator 440 with the electric power from the batteries 6.

Electric-Powered Air Conditioning Mode

This mode provides operation of the compressor 450 during stopping the engine 10. In this mode, the control unit 7 connects the second axis 422 to the third axis 423 with the clutch mechanism 430 and releases (unlocks) the lock mechanism 460, and operates the motor generator 440 in the motor mode. This stops the first axis 421 of the planetary gear mechanism 420 due to friction in the engine 10. Thus, the torque generated by the motor generator 440 is transmitted to the compressor 450 through the planetary gear mechanism 420 via the ring gear 424, the planet pinion gears, the sun gear 426, and the third axis 423 and as well as through the clutch mechanism 430. In this condition, the inverter 6 supplies the three phase currents to the motor generator 440 to obtain a necessary torque for rotation of the compressor 450 at a desired rotation speed.

Usual Mode 1

While the engine 10 runs, the motor generator 440 generates an electric power as mentioned above. If it is required to further operate the compressor 450, the control unit 7 makes the clutch 430 in a connection condition and releases the lock mechanism 460. This equalizes the rotation speed of the first axis 421 to that of the third axis in the planetary gear mechanism 420. Thus, the engine 10 rotates the motor generator 440 and the compressor 450 at the same rotation speed. Here, it is also possible to provide the torque assistance by driving the motor generator 440 with electric power from the batteries 6.

Figure 3:
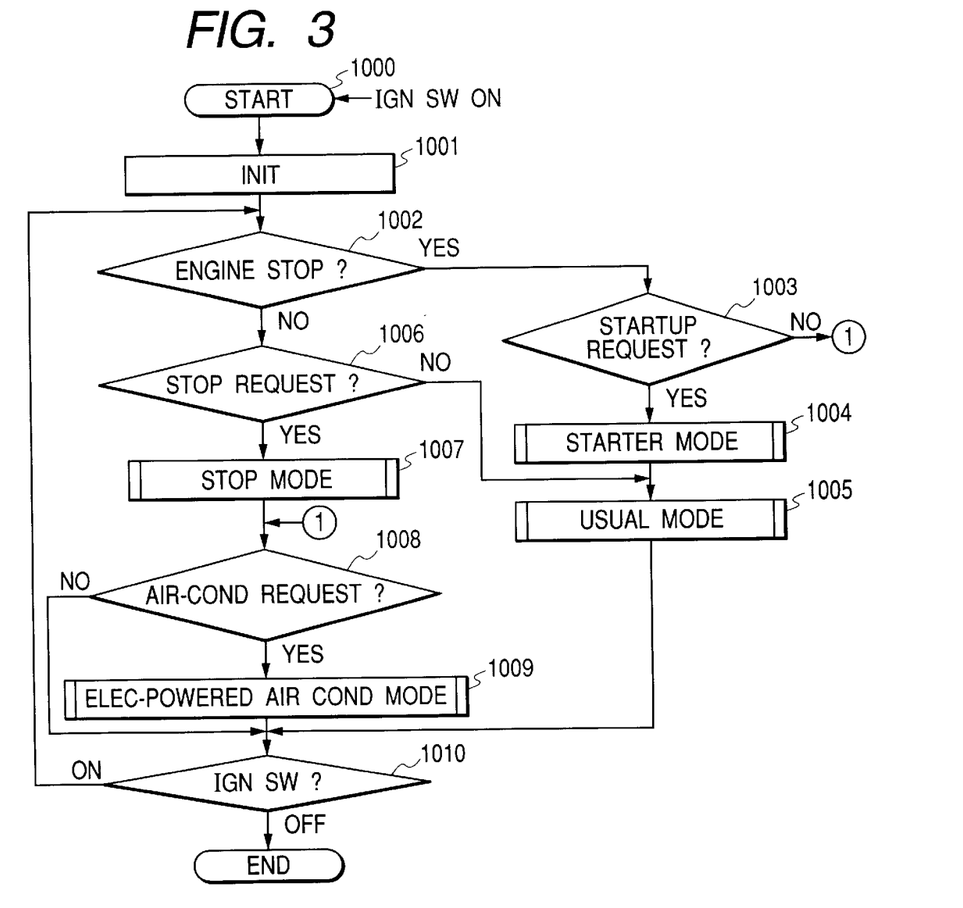
FIG. 3 depicts a flow chart of the operation in the system according to this invention.

FIG. 3 depicts a flow chart of the operation in the system (a flow chart of the main routine).

Turning on of the ignition switch starts this operation (step 1000). A microprocessor 7a in the control unit 7 initializes necessary portions therein in step 1001 and checks whether the engine 10 is stopping in step 1002. If NO in step 1002, processing proceeds to step 1006. If the engine 10 is stopping, the microprocessor 7a checks whether there is a request for finishing the idling-stop operation, that is, a request for the startup of the engine 10 in step 1003. If YES in step 1003, processing proceeds to a starter mode subroutine 1004. After the starter mode subroutine 1004, processing proceeds to a usual mode subroutine 1005 and advances to step 1010.

If NO in step 1003, processing proceeds to step 1008.

In step 1002, if the engine 10 is not stopping, the microprocessor 7a checks whether there is a request for engine stop in step 1006. If NO, processing proceeds to step 1005. If YES, the microprocessor 7a executes a stop mode subroutine 1007.

After the stop subroutine 1007 and if NO in step 1003, the microprocessor 7a judges whether there is a request for driving the compressor 450 on the basis of a signal from an air conditioning control unit (not shown) in step 1008. If NO in step 1008, processing proceeds to step 1010. If YES in step 1008, the microprocessor 7a executes an electric-powered air conditioning subroutine 1009. Next, processing proceeds to step 1010. In step 1010, the microprocessor 7a checks whether the ignition switch is turned off. If OFF, processing ends. If ON, processing returns to step 1002.

Usual Mode Subroutine

Figure 4:
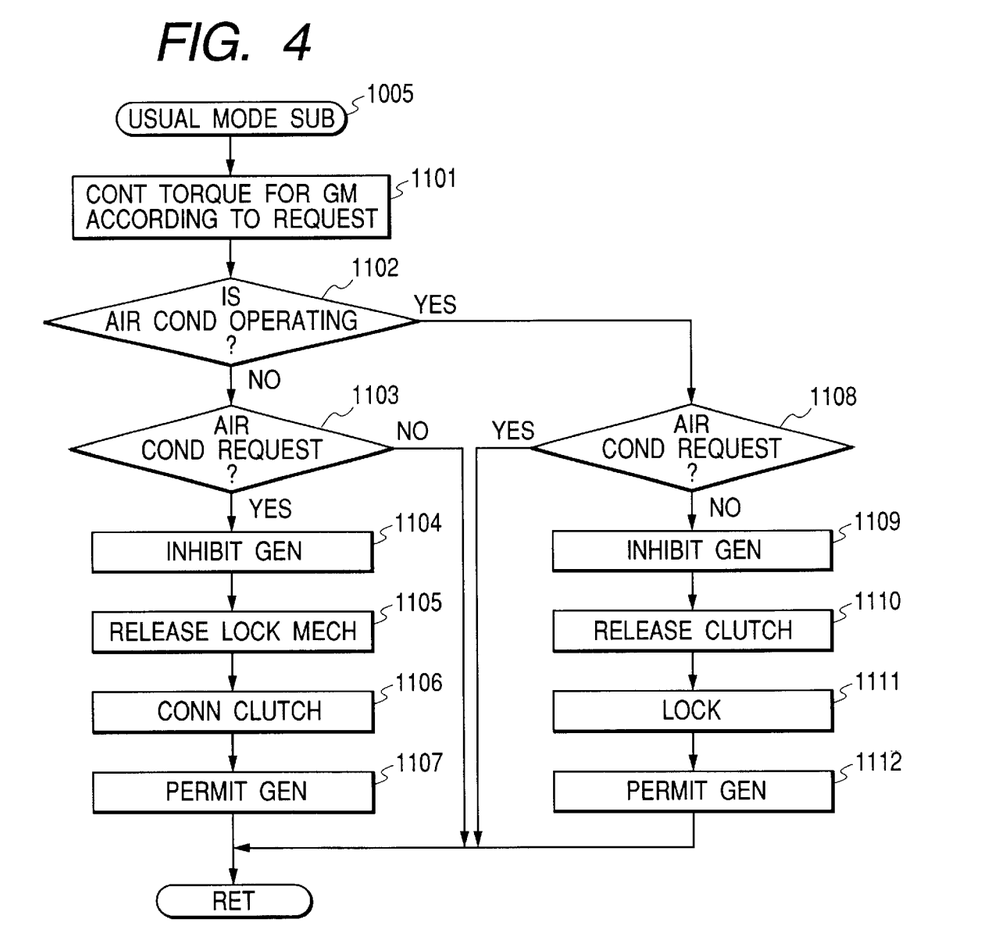
FIG. 4 depicts a flow chart of the usual mode subroutine shown in FIG. 3.

FIG. 4 depicts a flow chart of the usual mode subroutine 1005 includes operations of the usual mode 1 and usual mode 2.

In step 1101, the microprocessor 7a adjusts the torque for the motor generator 440 on the basis of conditions of the batteries 6 and the electric loads 8 in the motor vehicle through the engine control unit. In step 1102, the microprocessor 7a checks whether the compressor 450 is driven by the engine 10. If NO, the microprocessor 7a checks whether there is a request for driving the compressor 450 in step 1103. If NO, processing returns to the main routine shown in FIG. 3. If YES in step 1103, the microprocessor 7a inhibits the motor generator 440 from generating an electric power in step 1104, and releases the lock mechanism 460 in step 1105. Next, the microprocessor 7a connects the clutch 430 in step 1106 and permits the motor generator 440 to generate an electric power in step 1107, and processing returns to the main routine.

In step 1102, if the compressor 450 is operating, the microprocessor 7a checks whether there is a request for driving the compressor in step 1108. If YES, processing returns to the main routine in FIG. 3. If NO (air conditioning stop request), the microprocessor 7a inhibits the motor generator 440 from generating an electric power in step 1109, releases the clutch 430 in step 1110, and locks the third axis 423 with the lock mechanism 460 in step 1111. Next, the microprocessor 7a permits the motor generator 440 to generate an electric power in step 1112, and then processing returns to the main routine.

As mentioned above, inhibiting the motor generator 440 from generating an electric power for the switching period of the lock mechanism 460 between locking and unlocking and for the switching period of the clutch 430 between connection and disconnection provides smooth switching in the lock mechanism 460 and the clutch 430. Moreover, suppressing the operation of the motor generator 440 (inhibiting operation or reducing the efficiency) may be done instead inhibiting the operation of the motor generator 440. More specifically, the control unit 7 controls voltage vectors supplied to the motor generator 442 so as to decrease the quantity of the generated power.

Starter Mode

Figure 5:
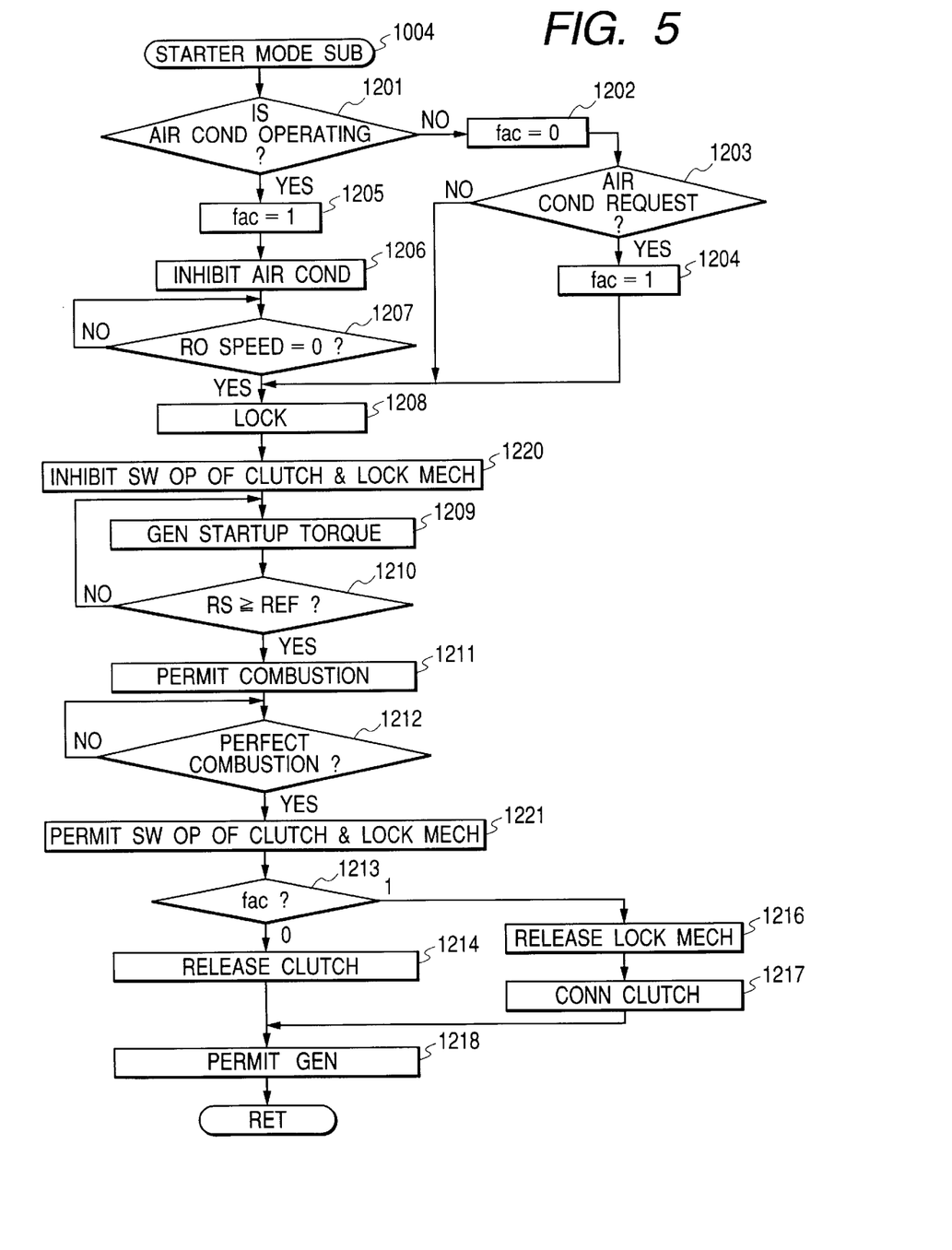
FIG. 5 shows a flow chart of the starter mode subroutine shown in FIG. 3.

FIG. 5 shows operations in the starter mode subroutine 1004.

In step 1201, the microprocessor 7a checks whether the compressor 450 is driven by the motor generator 440. If NO, the microprocessor 7a resets the flag fac indicating that the compressor 450 is operating in step 1202. In step 1203, the microprocessor 7a judges whether there is a request for driving the compressor 450 on the basis of the signals from the air conditioner control unit. If YES in step 1203, the microprocessor 7a sets the flag fac in step 1204. If NO, processing proceeds to step 1208 with bypassing step 1204.

In step 1201, if the compressor 450 is operating, the microprocessor 7a sets the flag fac to "1" in step 1205 and executes air condition operation inhibition operation in step 1206. Then, the microprocessor 7a waits for that the rotation speed of the motor generator 440 becomes zero in step 1207. When stop of the rotation of the motor generator 440 is confirmed and after steps 1203 and 1204, the microprocessor 7a locks the third axis 423 with the lock mechanism 460 to stop the rotation of the third axis 423 of the planetary gear mechanism 420 in step 1208. Next, the microprocessor 7a inhibits the switching operations of the clutch mechanism 430 and the lock mechanism 460 in step 1220.

Next, the microprocessor 7a operates the motor generator 440 in the motor mode to start up the engine in step 1209 until the rotation speed of the engine 10 exceeds a predetermined value in step 1210. Next, the microprocessor 7a permits the engine control unit (not shown) to supply fuel and to control the ignition, if necessary, in step 1211. Next, the microprocessor 7a waits until the engine becomes a perfect combustion condition, that is, until the rotation speed reaches the rotation maintainable speed in step 1212. Next, the microprocessor 7a permits the switching operations of the clutch mechanism 430 and the lock mechanism 460 in step 1221. Next, the microprocessor 7a checks the flag fac in step 1213. If the flag fac is zero, because this means that it is unnecessary to drive the compressor 450, the microprocessor 7a releases the clutch mechanism 430 in step 1214, and processing proceeds to step 1218. Here, the lock mechanism 460 was made in the lock condition in step 1208, so that the transition to the usual mode 2 shown in FIGS. 2 and 3 has been prepared.

In step 1213, if the flag fac is "1", because this means that it is necessary to drive the compressor 450, the microprocessor 7a releases the lock mechanism 460 in step 1216 and makes the clutch 430 in the connection condition to drive the compressor 450 in step 1217, and processing proceeds to step 1218. Thus, the transition to the usual mode 1 shown in FIG. 2 has been prepared. In step 1218, the microprocessor 7a controls the motor generator 440 (inverter 5) to generate the necessary electric power.

In the subroutine 1004 shown in FIG. 5, the operation condition of the compressor 450 after startup of the engine 10 was determined in accordance with the operation condition of the compressor 450 just before startup of the engine 10 caused by the finish of the idling stop. However, it is also possible to immediately inhibit the compressor 450 from operating for the engine startup period caused by the finish of the idling stop. Then, after startup of the engine 10, the microprocessor 7a checks the necessity of driving the compressor 450 again to determine whether the compressor 450 should be operated on the basis of the checking result.

The above-mentioned operations can reduce vibrations and sound noise because this eliminates switching the operation conditions of the lock mechanism 460 and the clutch 430 is inhibited for the startup transition period of the engine 10 (steps 1209 to 1212).

Stop Mode

Figure 6:
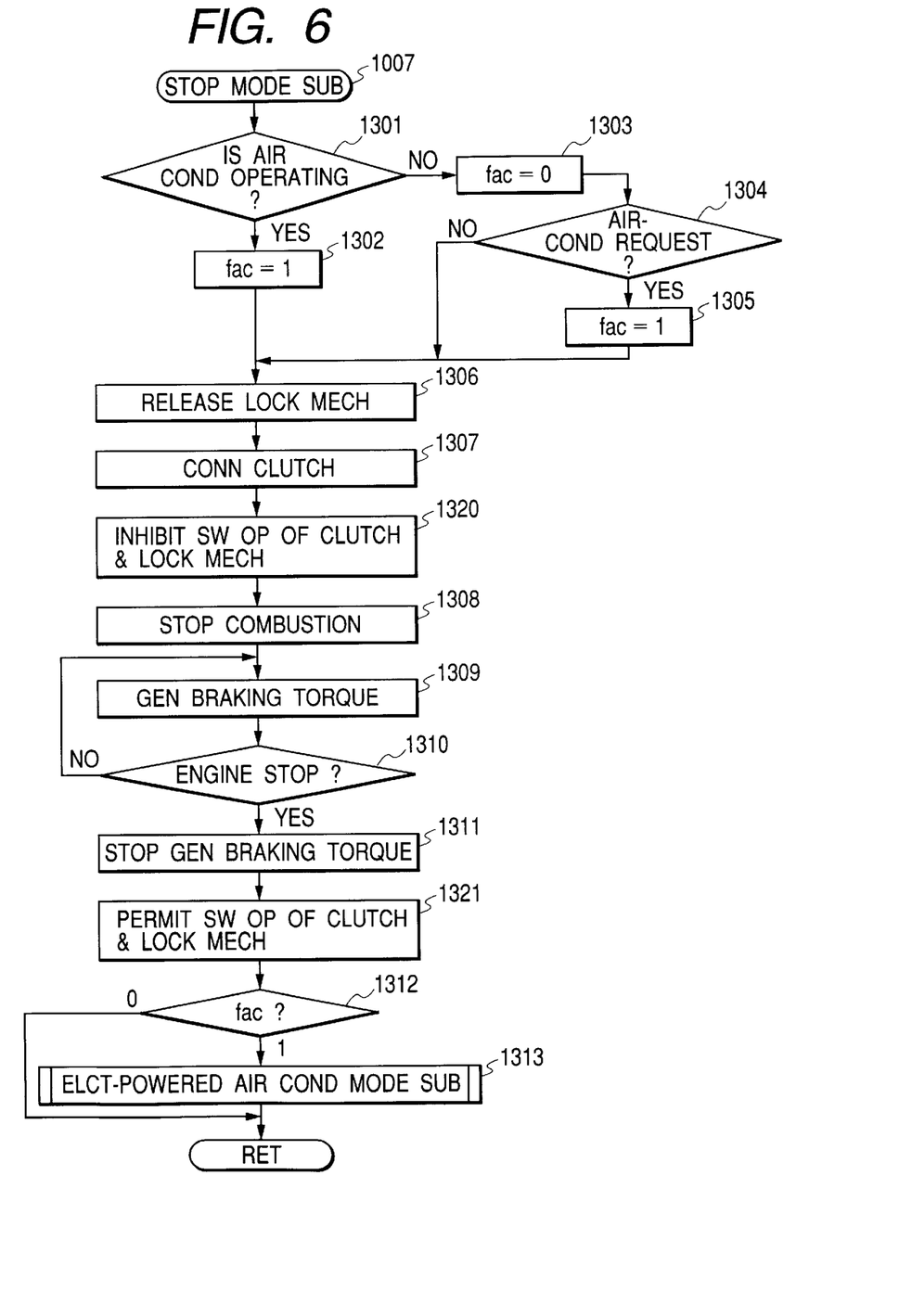
FIG. 6 shows a flow chart of the stop mode subroutine shown in FIG. 3.

FIG. 6 shows the stop mode subroutine 1007.

In step 1301, the microprocessor 7a checks whether the compressor 450 is being operated by the motor generator 440. If NO, in step 1301, the microprocessor 7a resets the flag fac indicating that the compressor 450 is operating in step 1303 and then, judges whether there is a request for driving the compressor 450 on the basis of the signal from the air conditioning control unit (not shown) in step 1304. If YES, the microprocessor 7a sets the flag fac to "1" in step 1305. If NO, processing proceeds to step 1306 with bypassing step 1305.

In step 1301, if the compressor 450 is operating, the microprocessor 7a sets the flag fac to "1" in step 1302, releases the lock mechanism in step 1306, and makes the clutch 430 in the connection condition in step 1307. Next, the microprocessor 7a inhibits the switching operations of the clutch mechanism 430 and the lock mechanism 460 in step 1320.

Next, the microprocessor 7a commands the engine control unit (not shown) to stop supplying fuel in step 1308 to stop the engine 10.

Next, the microprocessor 7a controls the motor generator 440 to generate regenerative braking torque in step 1309 until the engine 10 stops in step 1310. If the engine 10 stops in step 1310, the microprocessor 7a controls the inverter 5 to stop generating the regenerative braking torque in step 1311. Next, the microprocessor 7a permits the switching operations of the clutch mechanism 430 and the lock mechanism 460 in step 1321.

Next, the microprocessor 7a checks the flag fac in step 1312. If the flag fac is "1", the microprocessor 7a judges that there is a request for driving the compressor 450. Then, processing proceeds to the electric-powered air conditioning mode in step 1313. If the flag fac is "0", processing returns to the main routine with bypassing step 1313.

Here, in the stop mode shown in FIG. 6, it is also possible to stop the operation of the motor generator 440 before step 1306.

As mentioned above, because the engine 10 is braked by the load torque of the compressor 450 and the generation torque of the motor generator 440, the engine 10 stops immediately. Moreover, because switching the lock mechanism 460 and the clutch 430 is inhibited for the to-stop transition period of the engine 10 (steps 1320 to 1321), vibration and sound noise can be reduced.

Electric-Powered Air Conditioning Mode

Figure 7:
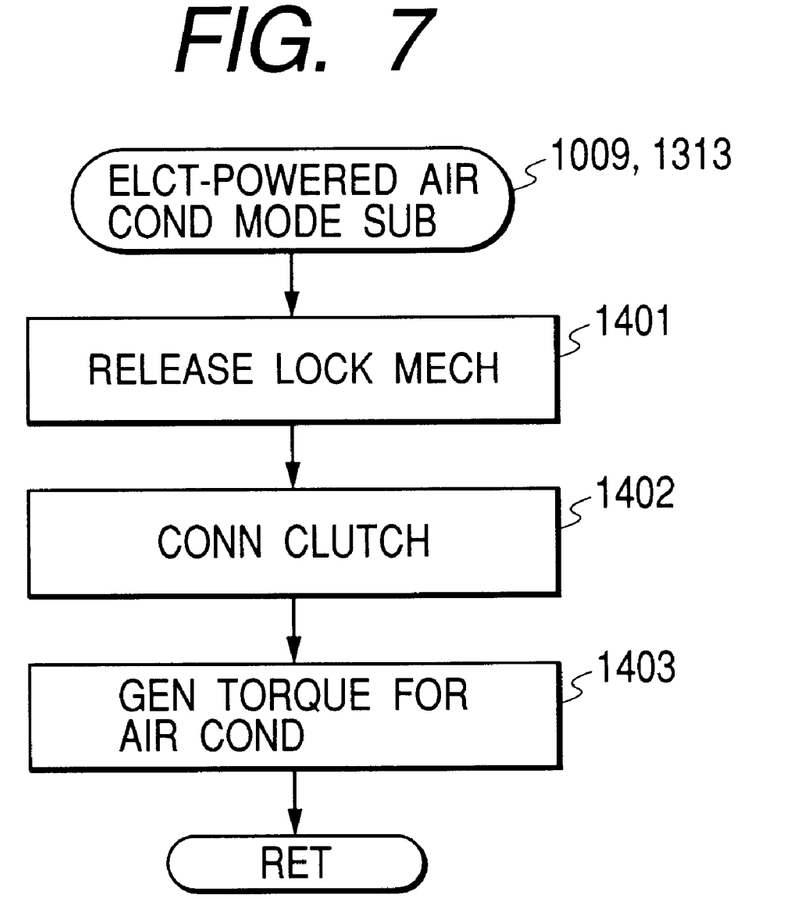
FIG. 7 shows the electric-powered air conditioning mode subroutines shown in FIG. 3.

FIG. 7 shows the electric-powered air conditioning mode subroutines 1009 and 1313.

At first, the microprocessor 7a releases the lock mechanism 460 in step 1401 and makes the clutch 430 in the connection condition in step 1402. Thus, the motor generator 440 can drive the compressor 450. Then, the microprocessor 7a controls the torque of the motor generator 440 to equalize the rotation speed of the compressor 450 to the rotation speed determined on the basis of the request from the air conditioning control unit in step 1403.

Modifications

In this embodiment, the planetary gear mechanism 420 is used as the torque distribution mechanism. However, a differential gear mechanism can provides the above-motioned operations. Moreover, the planetary gear mechanism 420 may be of ravineaus type. Moreover, the clutch 430 may make connections between either of two axes out of the first to third axes.

As mentioned above, the control unit 7 controls power transmissions between the first axis 421 and the second axis 422, between the first axis 421 and the third axis 423, and between the second axis 422 and the third axis 423 with the planetary gear mechanism 420, the clutch mechanism 430, the lock mechanism 460, and the inverter 5.

Moreover, the control unit 7 inhibits switching operations of the clutch mechanism 430 between the connection and the disconnection and the lock mechanism 460 between the locking and the unlocking for a startup transition period of the engine 10 (steps 1220–1221) and a to-stop transition period of the engine 10 (steps 1321–1321). In other words, the control unit 7 holds the just before conditions of the clutch mechanism 430 and the lock mechanism 460 for the startup transition period of the engine and the to-stop transition period of the engine 10.

More specifically, the control unit 7 inhibits the compressor 450 from operating by holding (keeping) the locking of said third axis 423 with the lock mechanism 460 and by holding (keeping) the disconnection of the second axis 422 from the third axis 423 for the startup transition period of the engine 10 and as well as operates the inverter 5 to operate the motor generator 440 in said motor mode to drive the engine through the planetary gear mechanism 420 to start up the engine 10. This is because if the switching operations of the clutch mechanism 430 between the connection and the disconnection and the lock mechanism 460 between the locking and the unlocking are made for the startup transition period of the engine 10 and the to-stop transition period of the engine 10, the magnitudes of vibrations and sound noise to the persons in the room of the motor vehicle increase because the ratio of the rotation speeds of respective axes in the functional combined equipment rapidly vary.

Moreover, the control unit 7 inhibits the inverter 5 from operating the motor generator 440 or suppresses the generation operation of the motor generator 440 in the generator mode (the motor mode on the torque assistance) for a startup transition period of the compressor 450 and a to-stop transition period of the compressor 450, while the engine 10 is running. This makes the variation in the rotation speed of the second axis 422 very easy while the conditions of the clutch mechanism 430 and the lock mechanism 460 are switched, so that torque distribution among respective axes in the power distribution mechanism can be smoothly varied. Accordingly, vibrations and sound noise can be reduced. Here, suppression of the operation of the motor generator 440 (inverter 5) may be gradually done on the regenerative operation and the torque assistance operation. Suppression of the generation operation is provided by stopping the generation operation or reducing the degree of the generation operation.

What is claimed is:

1. A functional combined equipment for a motor vehicle having an engine comprising:

a motor generator;

a compressor for air conditioning;

a power distributing mechanism for distributing a power at a first axis from said engine to a second axis coupled to said motor generator, and a third axis coupled to said compressor;

a clutch mechanism for connection of said second axis to said third axis and disconnection of said second axis from said third axis;

a lock mechanism for locking and unlocking rotation of said third axis; and a control unit for controlling power transmissions between said first and second axes, between said first and third axes, and between said second and third axes with said power distributing mechanism, said clutch mechanism, said lock mechanism, and said inverter, wherein said control unit inhibits switching operations of said clutch mechanism between said connection and said disconnection and said lock mechanism between locking and unlocking said rotation of said third axis for a startup transition period of said engine and a to-stop transition period of said engine.

2. The functional combined equipment as claimed in claim 1, wherein said control unit includes an inverter and operates said motor generator to supply a torque from said motor generator to said compressor using said inverter with unlocking rotation of said third axis with said lock mechanism, and with said connection of said second axis to said third axis using said clutch mechanism when said engine stops, and wherein said control unit locks said third axis with said lock mechanism and disconnects said second axis from said third axis when said compressor is driven by neither of said engine nor said motor generator.

3. The functional combined equipment as claimed in claim 1, wherein said control unit includes an inverter and inhibits said compressor from operating by holding said third axis locked with said lock mechanism and by holding said disconnection of said second axis from said third axis for said startup transition period of said engine and as well as operates said inverter to operate said motor generator in said motor mode to drive said engine through said power distributing mechanism to start up said engine.

4. The functional combined equipment as claimed in claim 1, wherein said control unit holds said rotation of said third axis locked with said lock mechanism and holds said connection of said second axis to said third axis with clutch mechanism for said to-stop transition period.

5. The functional combined equipment as claimed in claim 1, wherein said power distributing mechanism comprises a planetary gear mechanism.

6. The functional combined equipment as claimed in claim 5, wherein said planetary gear mechanism comprises a carrier connected to said first axis, a ring gear connected to said second axis, and a sun gear connected to said third axis.

7. A functional combined equipment for a motor vehicle having an engine comprising:

a motor generator;

an inverter for operating said motor generator in motor and generator modes;

a compressor for air conditioning;

a power distributing mechanism for distributing a power at a first axis from said engine to a second axis coupled to said motor generator, and a third axis coupled to said compressor;

a clutch mechanism for connection of said second axis to said third axis and disconnection of said second axis from said third axis;

a lock mechanism for locking and unlocking rotation of said third axis; and a control unit for controlling power transmissions between said first and second axes, between said first and third axes, and between said second and third axes with said power distributing mechanism, said clutch mechanism, said lock mechanism, and said inverter, wherein said control unit controls said inverter to suppress operation of said motor generator in said generator mode for a startup transition period of said compressor and a to-stop transition period of said compressor, while said engine runs.

8. The functional combined equipment as claimed in claim 7, wherein said control unit operates said motor generator to supply a torque from said motor generator to said compressor using said inverter with unlocking rotation of said third axis using said lock mechanism, and with said connection of said second axis to said third axis using said clutch mechanism when said engine stops, and wherein said control unit locks said third axis with said lock mechanism and disconnects said second axis with said clutch mechanism from said third axis when said compressor is driven by neither of said engine nor said motor generator.

9. The functional combined equipment as claimed in claim 7, wherein said power distributing mechanism comprises a planetary gear mechanism.

10. The functional combined equipment as claimed in claim 9, wherein said planetary gear mechanism comprises a carrier connected to said first axis, a ring gear connected to said second axis, and a sun gear connected to said third axis.

* * * * *